(No Model.)
S. D. WAGOR.
BURIAL APPARATUS.
No. 479,904. Patented Aug. 2, 1892.
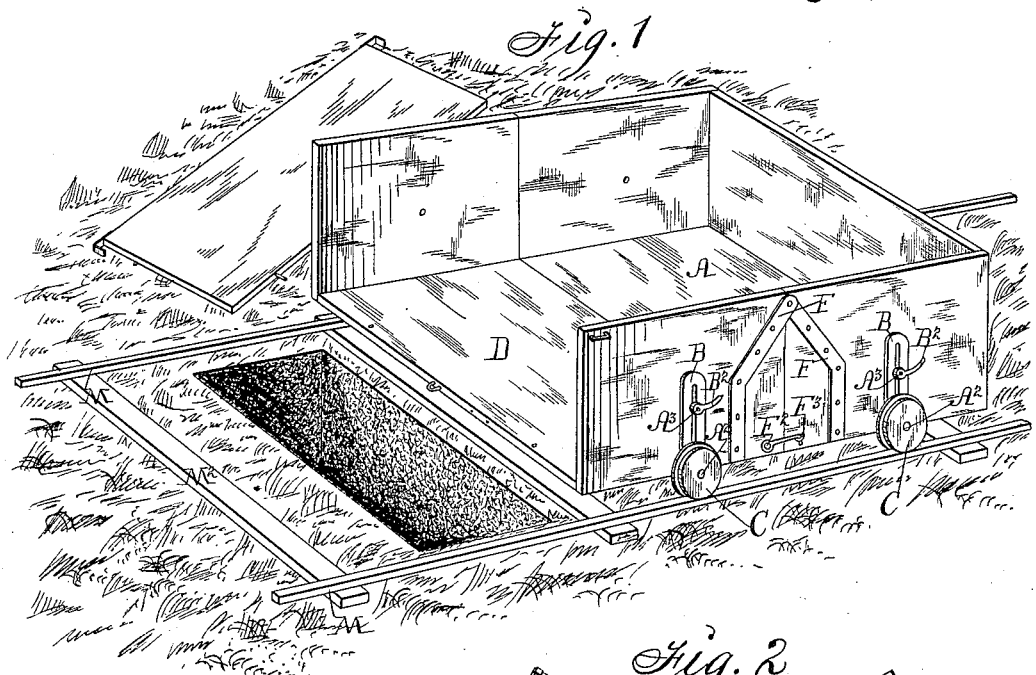
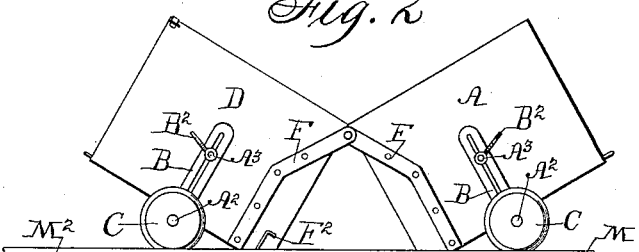
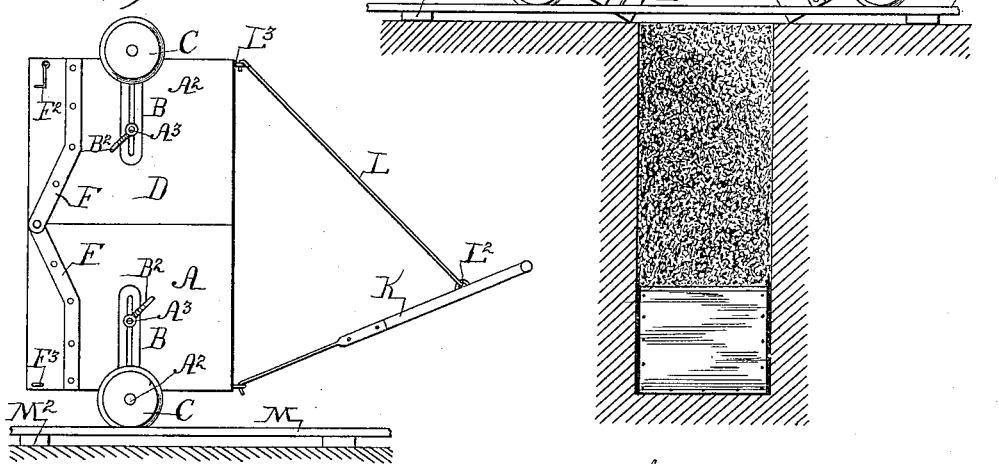
Witnesses:
W. J. Sankey.
R. H. Orwig.
Inventor: Samuel D. Wagor,
By Thomas C. Orwig, Atty.

UNITED STATES PATENT OFFICE.

SAMUEL D. WAGOR, OF WINTERSET, IOWA.

BURIAL APPARATUS.

SPECIFICATION forming part of Letters Patent No. 479,904, dated August 2, 1892.

Application filed April 28, 1892. Serial No. 431,095. (No model.)

*To all whom it may concern:*

Be it known that I, SAMUEL D. WAGOR, a citizen of the United States of America, residing at Winterset, in the county of Madison and State of Iowa, have invented a new and useful Dumping-Car, of which the following is a specification.

My object is to produce a car so arranged that earth, stones, &c., may be readily thrown thereupon from a ditch or grave and easily and quickly removed to a distance to be dumped or returned to the ditch or grave and deposited therein without being handled the second time.

My invention is particularly adapted for use in digging graves where the fresh earth heaped on the side thereof is objectionable, and is constructed with that end in view.

My invention consists, primarily, in the construction of a car arranged to be capable of vertical adjustment divided transversely in its central portion and hinged at its upper meeting edges, so that it may be dumped by being spread apart, and one section may be swung on top of the other for purposes of transportation, storage, &c., and in the construction of certain features therein, as hereinafter set forth, pointed out in my claims, and illustrated in the accompanying drawings, in which—

Figure 1 shows the complete device in perspective, with one of the end pieces removed, mounted on a track in juxtaposition to a grave, as required in practical use. Fig. 2 is a side view of a car at the top of a grave, shown in the position required to dump its contents into the grave. Fig. 3 is a side view of the complete device, showing the rear section placed on top of the forward one.

Referring to the accompanying drawings, the reference-letter A designates the forward car-section, which is rectangular in form and open at its top and rear end. It is mounted indirectly upon the axle $A^2$ by having the bolts $A^3$ secured to the side thereof and extended through the upwardly-extending slotted projections B, which are secured to the said axle.

$B^2$ represent nuts provided with handles for operating them placed on the ends of the bolts $A^3$. The flanged wheels C are placed on the ends of the axles $A^2$.

D represents a car-section in the rear of the section A and similar thereto save that its rear end is detachable. The said forward and rear car-sections are connected at their upper edges by means of the hinges F and at the under meeting edges by the hooks $F^2$, entering the staples $F^3$.

K is a handle or tongue secured to the aforesaid end of the section A.

L is a bar for the support of the rear car-section on top of the section A. It has a hook formed at each of its end portions adapted to enter the staples $L^2$ and $L^3$, secured to the top of the tongue and the rear end of the section D, respectively.

M M represent parallel rails secured to the cross-ties $M^2$ to provide a track upon which the car is placed.

It will be obvious that the body of the car might be mounted upon wagon-wheels and used for other purposes than those hereinbefore set forth. Therefore I do not desire to limit myself to the particular form of construction shown and described; but What I do claim as new, and desire to secure by Letters Patent, is—

1. A dumping-car comprising a rectangular box divided transversely in its central portion, mounted on wheels in such a manner as to be vertically adjustable thereupon, the two parts so formed being hinged to each other at their upper meeting edges and detachably connected with each other at their under meeting edges, and means for advancing the same, substantially as set forth.

2. A dumping-car comprising a rectangular box divided transversely in its central portion, mounted upon wheels, the forward and rear parts thereof being hinged to each other at their upper meeting edges and detachably connected at their under meeting-edges, and a tongue attached to the forward end of the device, substantially as set forth.

3. A dumping-car comprising a rectangular box open at its top and provided with a removable end piece divided transversely in its central portion, an axle having a flanged wheel on each end beneath each section, bolts projecting outwardly from the sides of the sections above the said axles, vertically-slotted upwardly-extending projections secured to the said axles and having the said bolts extended through the slots therein, nuts placed on the ends of the said bolts, hinges connecting the upper meeting edges of the said sections, and latches to connect the under meeting edges thereof, a tongue pivoted to the forward end thereof, and a bar adapted to be connected with the tongue and the rear section when it is placed on top of the forward section, all substantially as and for the purposes stated.

SAMUEL D. WAGOR.

Witnesses:
ED. A. NEWLIN,
M. E. BENNETT.